United States Patent
Xiong et al.

(10) Patent No.: US 11,681,135 B2
(45) Date of Patent: Jun. 20, 2023

(54) STRUCTURED ILLUMINATION MICROSCOPIC IMAGING SYSTEM

(71) Applicant: Suzhou Institute of Biomedical Engineering and Technology, Chinese Academy of Sciences, Suzhou (CN)

(72) Inventors: Daxi Xiong, Suzhou (CN); Xibin Yang, Suzhou (CN); Peipei Wang, Suzhou (CN)

(73) Assignee: Suzhou Institute of Biomedical Engineering and Technology, Chinese Academy of Sciences, Suzhou (CN)

( * ) Notice: Subject to any disclaimer, the term of this patent is extended or adjusted under 35 U.S.C. 154(b) by 239 days.

(21) Appl. No.: 16/607,371

(22) PCT Filed: Jun. 20, 2017

(86) PCT No.: PCT/CN2017/089163
§ 371 (c)(1),
(2) Date: Oct. 23, 2019

(87) PCT Pub. No.: WO2018/205357
PCT Pub. Date: Nov. 15, 2018

(65) Prior Publication Data
US 2020/0142171 A1 May 7, 2020

(30) Foreign Application Priority Data
May 12, 2017 (CN) .......................... 201710334448.0

(51) Int. Cl.
*G02B 21/06* (2006.01)
*G02B 21/00* (2006.01)
(Continued)

(52) U.S. Cl.
CPC .......... *G02B 21/06* (2013.01); *G02B 21/006* (2013.01); *G02B 5/08* (2013.01); *G02B 27/09* (2013.01)

(58) Field of Classification Search
CPC .......................... G02B 21/00; G02B 21/0004; G02B 21/0032; G02B 21/006; G02B 21/0076;
(Continued)

(56) References Cited

U.S. PATENT DOCUMENTS

| | | | | |
|---|---|---|---|---|
| 4,852,985 A | * | 8/1989 | Fujihara | ................. G02B 21/08 |
| | | | | 359/387 |
| 6,366,267 B1 | * | 4/2002 | Song | .................. H04M 1/0266 |
| | | | | 345/82 |

(Continued)

FOREIGN PATENT DOCUMENTS

| | | |
|---|---|---|
| CN | 102540446 A | 7/2012 |
| CN | 103018173 A | 4/2013 |

(Continued)

*Primary Examiner* — Thong Q Nguyen
(74) *Attorney, Agent, or Firm* — Bayramoglu Law Offices LLC

(57) ABSTRACT

A structured illumination microscopic imaging system includes a structured illumination source. A beam shaping lens, an excitation optical filter and a dichroic mirror are provided on the emission light path of the structured illumination source in sequence. An objective lens and a sample are provided on the first optical path of the dichroic mirror in sequence. An emission optical filter, a tube lens, and a detector are provided on the second optical path of the dichroic mirror in sequence. The super-resolution microscopic images with a higher signal-to-noise ratio and higher contrast can be obtained under the premise of lowering the installation and processing precision requirements of the structured illumination microscopic imaging system. Compared to a structured light microscopic imaging system (Continued)

based on digital micromirror arrays or gratings, the system cost is reduced and the system stability is higher.

11 Claims, 5 Drawing Sheets

(51) Int. Cl.
*G02B 5/08* (2006.01)
*G02B 27/09* (2006.01)
(58) Field of Classification Search
CPC .. G02B 21/06; G02B 21/125; G02B 21/0012; G02B 21/0016; G02B 21/0028; G02B 21/0064
USPC .................................. 359/385–390, 368–389
See application file for complete search history.

(56) References Cited

U.S. PATENT DOCUMENTS

| | | | |
|---|---|---|---|
| 6,864,976 B2* | 3/2005 | Tanaami ............ | G01N 21/6428 250/458.1 |
| 7,532,323 B2* | 5/2009 | Tang ................. | G01N 21/6458 356/317 |
| 8,125,709 B2* | 2/2012 | Hoering ................. | G02B 21/06 359/368 |
| 8,922,885 B2* | 12/2014 | Ganser ................... | G02B 21/16 359/385 |
| 9,461,024 B2* | 10/2016 | Hussell ............... | H01L 25/0753 |
| 9,480,399 B2* | 11/2016 | Reimer .................... | A61B 3/13 |
| 2003/0219754 A1* | 11/2003 | Oleksy ............... | G01N 21/6428 435/6.12 |
| 2005/0151094 A1* | 7/2005 | Kitagawa ........... | G02B 21/0032 250/458.1 |
| 2005/0248839 A1* | 11/2005 | Yamaguchi ............ | G02B 21/16 359/368 |
| 2010/0302630 A1* | 12/2010 | Paulus ................... | G02B 21/06 359/385 |
| 2017/0059841 A1* | 3/2017 | Trulson ............... | G02B 19/0014 |
| 2018/0074305 A1* | 3/2018 | Atzler ................ | G01N 21/6458 |

FOREIGN PATENT DOCUMENTS

| | | | |
|---|---|---|---|
| CN | 103091298 A | | 5/2013 |
| CN | 103792654 A | | 5/2014 |
| CN | 204008465 U | | 12/2014 |
| CN | 104765138 A | | 7/2015 |
| CN | 216057017 | * | 3/2022 |
| EP | 0948754 B1 | | 6/2014 |
| KR | 20140112486 | * | 9/2014 |

* cited by examiner

Bright fringes — Dark fringes

Bright fringes — Dark fringes

STRUCTURED ILLUMINATION MICROSCOPIC IMAGING SYSTEM

CROSS REFERENCE TO THE RELATED APPLICATIONS

This application is the national phase entry of International Application No. PCT/CN 2017/089163, filed on Jun. 20, 2017, which is based upon and claims priority to Chinese Patent Application No. 201710334448.0, filed on May 12, 2017, the entire contents of which are incorporated herein by reference.

TECHNICAL FIELD

The present disclosure relates to the field of optics, in particular to a structured illumination microscopic imaging system.

BACKGROUND

The structured illumination microscopic imaging technique is a super-resolution microscopic imaging technique based on an optical microscope. In the super-resolution microscopic imaging technique, the sample is illuminated by using the specially modulated structured light field, and the information of focusing planes is extracted from the modulated image data of different phases by using the phase shift algorithm, and the image data of the structured illumination microscopic imaging is acquired, which can break through the restriction of the ordinary optical microscopes due to the optical diffraction limit to achieve a higher microscopic imaging resolution.

In the very beginning, the structured illumination microscopy is realized by adding a sinusoidal grating to the illumination optical path, and the grating pattern is projected onto the sample to form structured light. Nevertheless, in these systems, where the structured illumination is obtained through the grating, the grating must be moved to obtain the source image at different phase shifts. In this way, the mechanical moving device will diminish system stability.

Chinese Patent No. 201110448980.8 discloses a high-speed structured illumination optical microscopic system and method based on digital micromirror devices, which realizes the high-speed imaging and has a high light energy utilization. However, the spatial light modulator has some shortcomings, such as the high cost, the limited imaging speed, the large system volume and so on.

Besides, in a microscopic system, structured illumination is realized by using an array of LED light sources combined with fly-eye lenses. The system needs to introduce the fly-eye lens, and it is extremely difficult to process, install and modulate the fly-eye lens since the installation precision and the processing precision are very high. If the fly-eye lens does not meet the requirements for the installation precision and the processing precision, then the structured illumination microscopic imaging system equipped with the fly-eye lens fails to obtain a microscopic image having high contrast and a high signal-to-noise ratio.

SUMMARY

An objective of the present disclosure is to provide a structured illumination microscopic imaging system, which can solve the problems of the existing structured illumination microscopic imaging system, such as the high cost, the difficulty in assembly and modulation and the poor stability.

According to one aspect of the present disclosure, a structured illumination microscopic imaging system includes:

a structured illumination source;

a beam shaping lens, an excitation optical filter and a dichroic mirror provided on an emission light path of the structured illumination source in sequence;

an objective lens and a sample provided on a first optical path of the dichroic mirror in sequence;

an emission optical filter, a tube lens, and a detector provided on a second optical path of the dichroic mirror in sequence.

Further, in the above-mentioned structured illumination microscopic imaging system, the objective lens and the sample are sequentially provided on the light-reflection path of the dichroic mirror; the emission optical filter, the tube lens and the detector are sequentially provided on the light-transmission path of the dichroic mirror.

Further, in the above-mentioned structured illumination microscopic imaging system, the objective lens and the sample are sequentially provided on the light-transmission path of the dichroic mirror; the emission optical filter, the tube lens and the detector are sequentially provided on the light-reflection path of the dichroic mirror.

Further, in the above-mentioned structured illumination microscopic imaging system, the structured illumination source includes a micro-sized illuminating light source for producing structured light having bright and dark fringes.

Further, in the above-mentioned structured illumination microscopic imaging system, the micro-sized illuminating light source includes a substrate and an array of light emitting units arranged on the substrate. Further, in the above-mentioned structured illumination microscopic imaging system, the size of each of the light emitting units is not more than a square area of 500 μm×500 μm.

Further, in the above-mentioned structured illumination microscopic imaging system, the beam shaping lens is provided on the emission light path of the structured illumination source;

the excitation optical filter is provided on the emission light path of the beam shaping lens;

the dichroic mirror is configured to reflect structured light on the emission light path of the excitation optical filter to the objective lens.

Further, in the above-mentioned structured illumination microscopic imaging system, the objective lens is configured to receive structured light reflected by the dichroic mirror and project the received structured light onto the sample;

the sample is configured to receive structured light projected by the objective lens to form structured illumination and to excite fluorescence, and the fluorescence is sequentially transmitted through the objective lens and the dichroic mirror.

Further, in the above-mentioned structured illumination microscopic imaging system, the emission optical filter is configured to filter the fluorescence transmitted through the dichroic mirror;

the tube lens is provided on the light-transmission path of the emission optical filter for collecting and transmitting the fluorescence filtered by the emission optical filter;

the fluorescence detector is configured to receive the fluorescence transmitted by the tube lens.

Further, in the above-mentioned structured illumination microscopic imaging system, the structured illumination source is conjugated with the surface of the sample, the surface of the sample is also conjugated with the imaging surface of the detector.

Further, in the above-mentioned structured illumination microscopic imaging system, the beam shaping lens includes one or more lenses.

Compared with the prior art, the present disclosure includes the structured illumination source. The beam shaping lens, the excitation optical filter and the dichroic mirror are provided on the emission light path of the structured illumination source in sequence. The objective lens and the sample are provided on the first optical path of the dichroic mirror in sequence. The emission optical filter, the tube lens, and the detector are provided on the second optical path of the dichroic mirror in sequence. Compared to the structured illumination microscopic imaging system provided with the fly-eye lens, the present disclosure can obtain super-resolution microscopic images with a higher signal-to-noise ratio and higher contrast under the premise of reducing the installation and processing precision requirements of the structured illumination microscopic imaging system. Compared to the structured illumination microscopic imaging system based on digital micromirror arrays or gratings, the present disclosure significantly minimizes the system cost and has better system stability. Additionally, in the present disclosure, the illumination source of micro-sized light-emitting diode serves as the structural illumination source, so the structural light microscopic imaging system is simple in structure, and can be readily installed and modulated. Furthermore, it is a relatively low-cost way to obtain the structured illumination microscopic optical system with high resolution, high stability and high contrast.

BRIEF DESCRIPTION OF THE DRAWINGS

The embodiments forming no limit are specifically described with reference to the following drawings, so that other features, objectives and advantages of the present disclosure will become more explicit.

The same or similar reference numerals in the drawings denote the same or similar components.

DETAILED DESCRIPTION OF THE EMBODIMENTS

The present disclosure will be further described in detail below with reference to the drawings.

Figure 1:
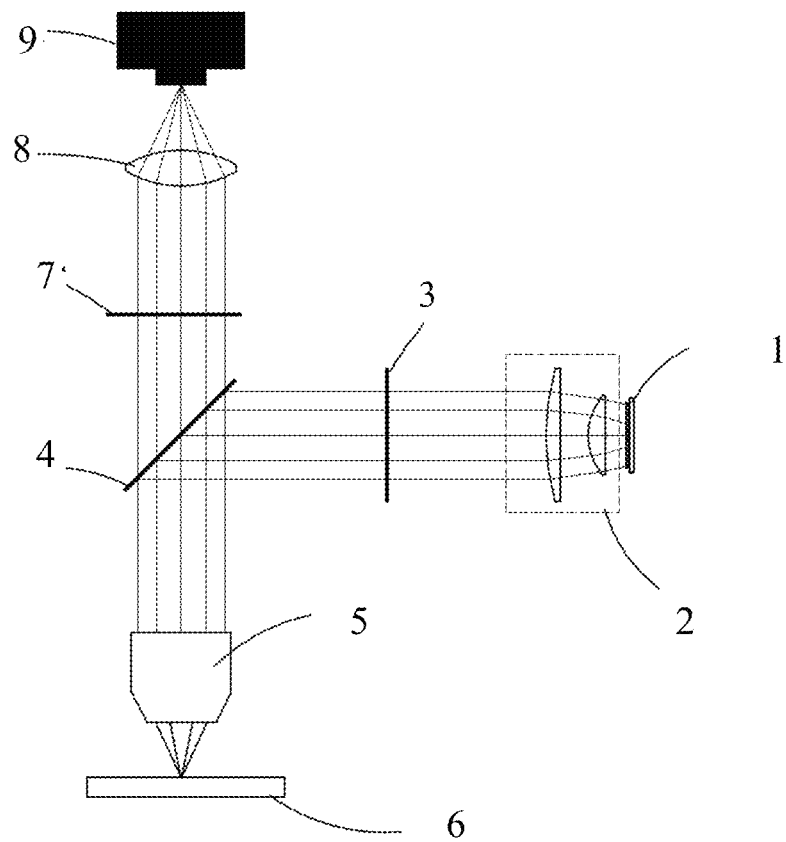
FIG. 1 shows a schematic diagram of a structured illumination microscopic imaging system in accordance with an embodiment of the present disclosure.
Figure 2:
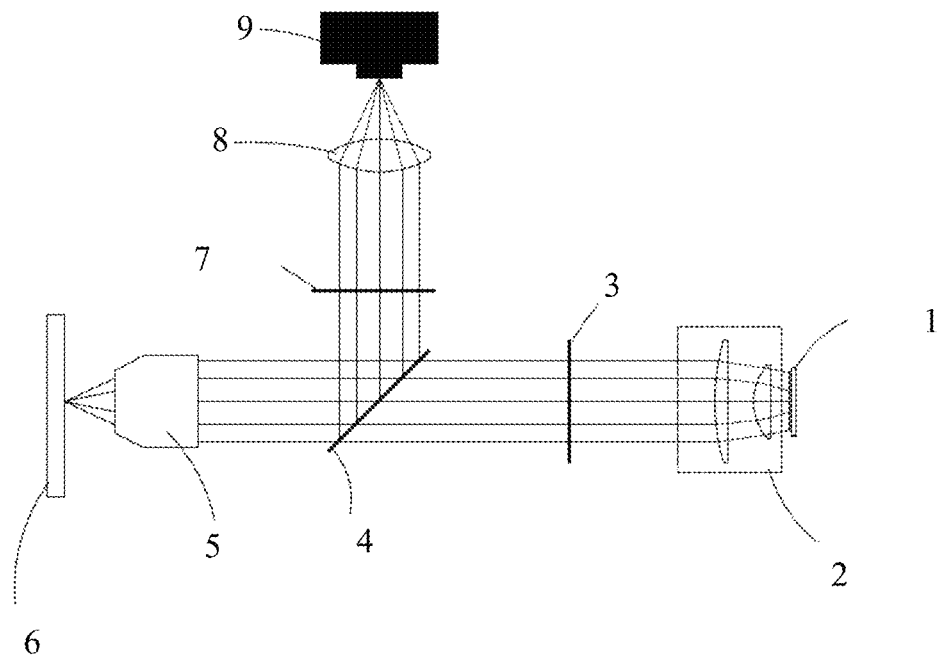
FIG. 2 shows a schematic diagram of a structured illumination microscopic imaging system in accordance with another embodiment of the present disclosure.

As shown in FIG. 1 and FIG. 2, the present disclosure provides a structured illumination microscopic imaging system, including:

the structured illumination source 1.

The beam shaping lens 2, the excitation optical filter 3 and the dichroic mirror 4 are provided on the emission light path of the structured illumination source 1 in sequence. Specifically as shown in FIG. 1 and FIG. 2, the beam shaping lens 2, the excitation optical filter 3 and the dichroic mirror 4 can be provided on the emission light path of the structured illumination source from near the structured illumination source 1 to a distance in sequence.

The objective lens 5 and the sample 6 are provided on the first optical path of the dichroic mirror 4 in sequence; Specifically as shown in FIG. 1 and FIG. 2, the objective lens 5 and the sample 6 can be provided on the first optical path of the dichroic mirror 4 from near the dichroic mirror 4 to a distance in sequence.

The emission optical filter 7, the tube lens 8, and the detector 9 are provided on the second optical path of the dichroic mirror 4 in sequence. As shown in FIG. 1 and FIG. 2, the emission optical filter 7, the tube lens 8 and the detector 9 can be provided on the second optical path of the dichroic mirror from the dichroic mirror in sequence. Specifically, the first optical path and the second optical path of the dichroic mirror are parallel or vertical. Compared to a structured illumination microscopic imaging system provided with a fly-eye lens, the structured illumination microscopic imaging system of the embodiment can obtain super-resolution microscopic images with a higher signal-to-noise ratio and higher contrast under the premise of lowering the installation and processing precision requirements of the structured illumination microscopic imaging system. Compared to a structured illumination microscopic imaging system based on digital micromirror arrays or gratings, the structured illumination microscopic imaging system of the embodiment significantly reduces the system cost and has the greater system stability.

In an embodiment of the structured illumination microscopic imaging system of the present disclosure, as shown in FIG. 1, the first optical path of the dichroic mirror 4 is a light-reflection path of the dichroic mirror, the second optical path of the dichroic mirror 4 is a light-transmission path of the dichroic mirror. Consequently, the objective lens and the sample are sequentially provided on the light-reflection path of the dichroic mirror, and the emission optical filter, the tube lens and the detector are sequentially provided on the transmission optical path of the dichroic mirror.

In an embodiment of the structured illumination microscopic imaging system of the present disclosure, as shown in FIG. 2, the first optical path of the dichroic mirror 4 is a light-transmission path of the dichroic mirror, the second optical path of the dichroic mirror 4 is a light-reflection path of the dichroic mirror. Consequently, the objective lens and the sample are sequentially provided on the light-transmission path of the dichroic mirror; the emission optical filter, the tube lens and the detector are sequentially provided on a light-reflection path of the dichroic mirror.

Figure 3:
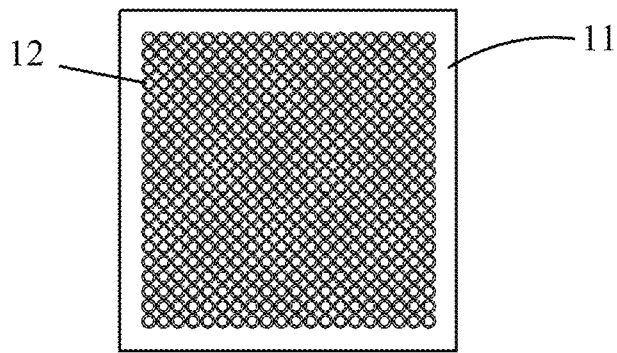
FIG. 3 shows a front view of an array of circular light emitting units arranged on a substrate in accordance with an embodiment of the present disclosure.
Figure 4:
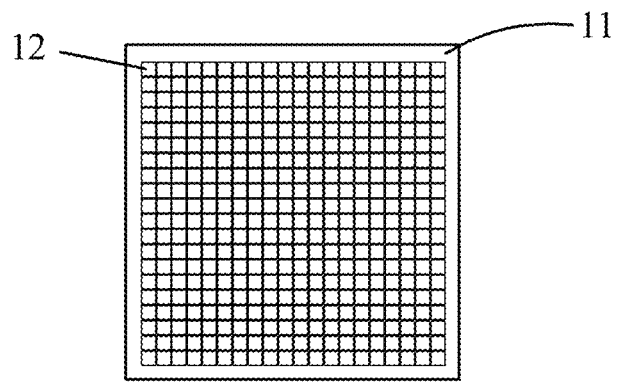
FIG. 4 shows a front view of an array of square light emitting units arranged on a substrate in accordance with an embodiment of the present disclosure.
Figure 5:
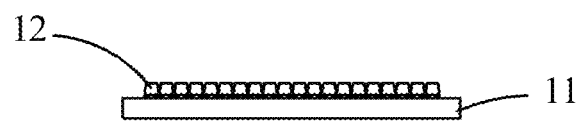
FIG. 5 shows a side view of FIG. 4.

In an embodiment of the structured illumination microscopic imaging system of the present disclosure, the structured illumination source includes a micro-sized light emitting diode source (MicroLED) for producing structured light having bright and dark fringes. Herein, the MicroLED technology, that is, the LED miniaturization and matrixing technique, refers to that a high-density and micro-sized LED array is integrated on one chip, and each of the light-emitting units can be addressed and separately driven to illuminate. The MicroLED technology has the characteristics of high efficiency, high brightness, high reliability, fast response time, and self-illumination without a backlight, and has the advantages of energy economization, a simple structure, a small size and thin type. As shown in FIGS. 3-5, the micro-sized light-emitting diode light source 1 is composed of a substrate 11 and an array of light-emitting units 12 provided on the substrate, and each light-emitting unit 12 is a micro-sized light-emitting diode. In this embodiment, the required structured light fringes of the structured illumination microscopic imaging system can be obtained by controlling the micro-sized light emitting diode array, and the objective of the super-resolution microscopic imaging is realized by the quick switching and phase shift of the structured light fringes. Compared to the traditional structured illumination microscopic imaging system based on DMD or gratings, the structured illumination microscopic imaging system based on micro-sized light emitting diode array of this embodiment has a simple structure, and a lower cost, and can be easily installed and modulated.

In the embodiment, the structured light with bright and dark fringes is generated by micro-sized light emitting diodes to realize the structured illumination, instead of using gratings or two-dimensional spatial light modulator in traditional structured light microscopic imaging system, which greatly simplifies the optical path structure of the illumination system and reduces the cost of structured illumination microscopic imaging system. Meanwhile, due to the properties of high efficiency, high brightness, high reliability and the short response time of the micro-sized light emitting diodes, the structured illumination microscopic imaging system based on micro-sized light emitting diodes has higher reliability and higher stability. The structured illumination microscopic imaging system of the embodiment obtains a structured illumination microscopic optical system with high resolution, high stability and high contrast.

In an embodiment of the structured illumination microscopic imaging system of the present disclosure, each of the light emitting units corresponds to one independent driving circuit, and simultaneously emits one or more different wavelengths of light so that the micro-sized LED light source generates the specific structured light. For example, the wavelength of the emitted light of a certain light-emitting unit is 488 nm.

In an embodiment of the structured illumination microscopic imaging system of the present disclosure, the shape of the light emitting unit is square or circular. For example, FIG. 3 shows a front view of an array of circular light emitting units provided on the substrate, FIG. 4 shows a front view of an array of square light emitting units provided on the substrate, FIG. 5 shows a side view of FIG. 4. The size of each light emitting unit does not exceed a range of 500 μm×500 μm square area. For example, the shape of the light emitting unit is square or circular, the circular light emitting units has a diameter of 1-500 μm, and the square light emitting units has a size of 1 μm×1 μm-500 μm×500 μm. Further, the circular light emitting units can have a diameter of 1-500 μm, the square light emitting units can have a size of 1 μm×1 μm-500 μm×500 μm.

In an embodiment of the structured illumination microscopic imaging system of the present disclosure, the beam shaping lens is provided on the emission light path of the structured illumination source;

the excitation optical filter is provided on the emission light path of the beam shaping lens;

the dichroic mirror is configured to reflect the structured light on the emission light path of the excitation optical filter to the objective lens.

In an embodiment of the structured illumination microscopic imaging system of the present disclosure, the objective lens is configured to receive the structured light reflected by the dichroic mirror and project the received structured light onto the sample. Specifically, the objective lens is configured to receive structured light reflected by the dichroic mirror and project the received structured light to the sample after amplifying according to a preset magnification.

The sample is provided on a stage for receiving structured light projected by the objective lens to form the structured light and excite to generate fluorescence, and the fluorescence is transmitted through the objective lens and the dichroic mirror in sequence.

In an embodiment of the structured illumination microscopic imaging system of the present disclosure, the emission optical filter is configured to filter the fluorescence transmitted through the dichroic mirror;

the tube lens is provided on the light-transmission path of the emission optical filter for collecting and transmitting the filtered fluorescence of the emission optical filter;

the fluorescence detector is configured to receive fluorescence transmitted by the tube lens.

In an embodiment of the structured illumination microscopic imaging system of the present disclosure, the structured illumination source is conjugated with the surface of the sample, and the surface of the sample is conjugated with the imaging surface of the detector, which ensures that the images collected by the detector have high contrast and a high signal-to-noise ratio.

Figure 6:
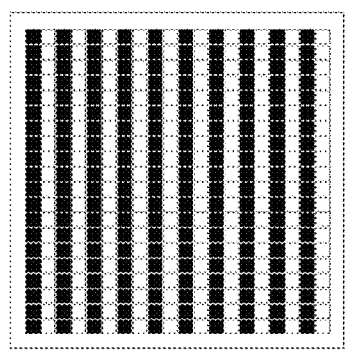
FIG. 6 shows a schematic diagram of longitudinal fringes formed by the square light emitting units in accordance with an embodiment of the present disclosure.
Figure 7:
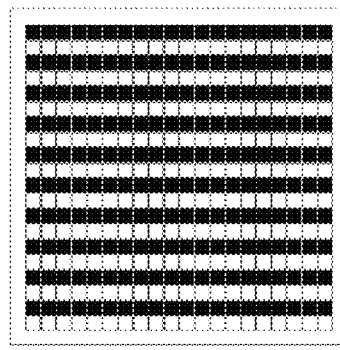
FIG. 7 shows a schematic diagram of transverse fringes formed by the square light emitting units in accordance with an embodiment of the present disclosure.
Figure 8:
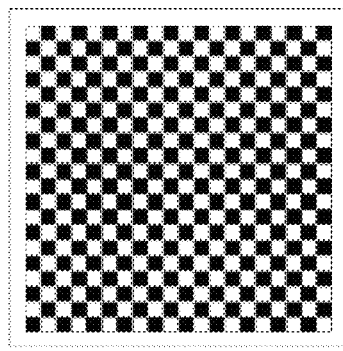
FIG. 8 shows a schematic diagram of oblique fringes formed by the square light emitting units in accordance with an embodiment of the present disclosure.

In an embodiment of the present disclosure, the micro-sized light emitting diode light source (microLED) is an array of light emitting units with a resolution of 512×512, wherein each light emitting unit is a square with a size of 20 μm×20 μm, and a spacing between adjacent light emitting units is 4 μm. FIGS. 6-8 show micro-sized light emitting diodes arrays with square light emitting units, and each of the illumination units in the array is independently controllable for obtaining the desired structural light fringes, including longitudinal fringes (FIG. 6), transverse fringes (FIG. 7), and oblique fringes with angle of 45° (FIG. 8).

Figure 9:
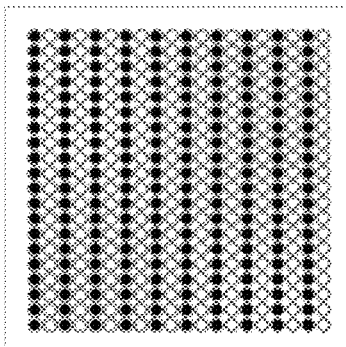
FIG. 9 shows a schematic diagram of longitudinal fringes formed by the circular light emitting units in accordance with an embodiment of the present disclosure.
Figure 10:
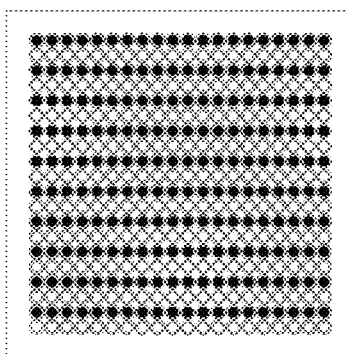
FIG. 10 shows a schematic diagram of transverse fringes formed by the circular light emitting units in accordance with an embodiment of the present disclosure.
Figure 11:
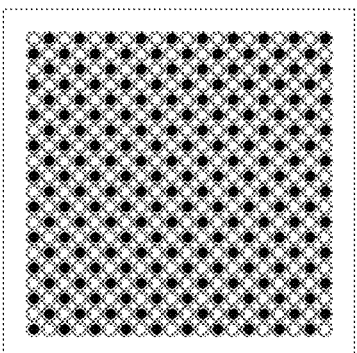
FIG. 11 shows a schematic diagram of oblique fringes formed by the circular light emitting units in accordance with an embodiment of the present disclosure.

Similarly, as shown in FIGS. 9-11, the light emitting unit of the micro-sized light emitting diode may be a circle with a diameter of 20 μm. The beam shaping lens includes one or more lenses, and the focal length of the beam shaping lens is 270 mm. The magnification of the objective lens is 100, and the focal length of the objective lens is 1.8 mm. Because the spacing between light emitting units of micro-sized light emitting diodes is only 4 μm, after projecting to the sample surface through the beam shaping lens, the dichroic lens and the objective lens, the spacing between the images on the sample surface is not more than 200 nm, which is less than half of the wavelength of the emitted light (488 nm). The diffraction limit is reached to obtain the continuous fringe light on the surface of the sample. Without the fly-eye lens to double the number of fringes, the spacing of the light-emitting units is smaller than the diffraction limit to obtain continuous fringe light. The elimination of the fly-eye lens can reduce the difficulty of system modulation and processing, and improve the contrast and the signal-to-noise ratio of the microscopic image to make the imaging quality higher.

Figure 12:
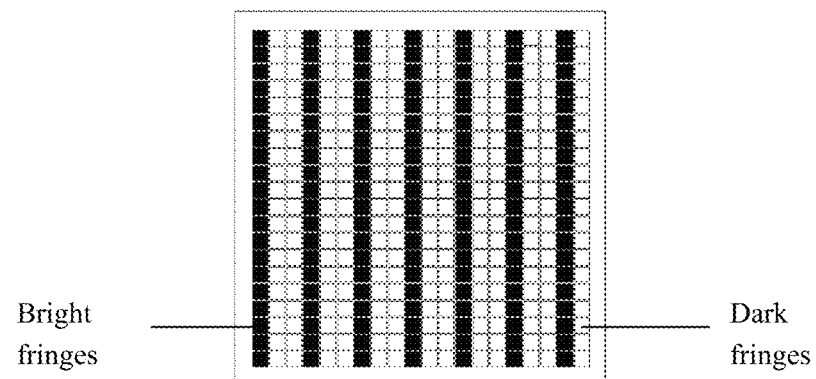
FIG. 12 shows a longitudinal structured light fringe with a duty ratio of 1:2 in accordance with an embodiment of the present disclosure.
Figure 13:
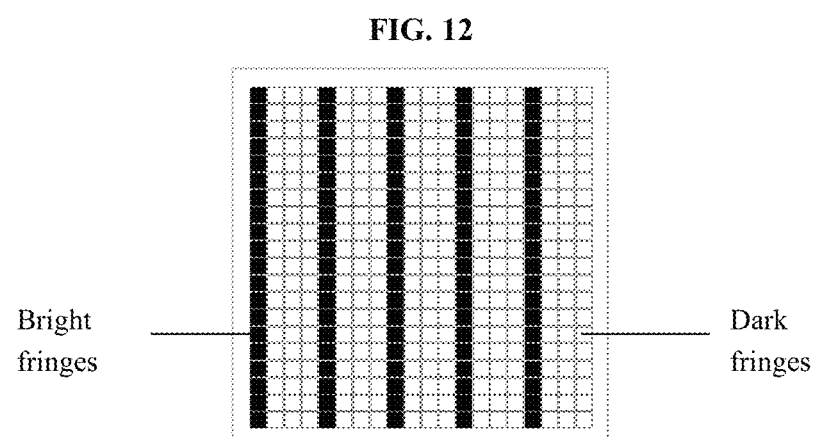
FIG. 13 shows a longitudinal structured light fringe with a duty ratio of 1:3 in accordance with an embodiment of the present disclosure.

In order to further improve the imaging quality of the structured illumination microscopic imaging system, the duty ratio of the fringe light, that is, the ratio of light and dark fringes can be appropriately adjusted, so as to increase the contrast of the fringe light and to achieve the purpose of improving the imaging quality. FIGS. 12-13 show the longitudinal structural light fringes of the light and dark fringes with a duty ratio of 1:2 and 1:3, respectively.

Figure 14:
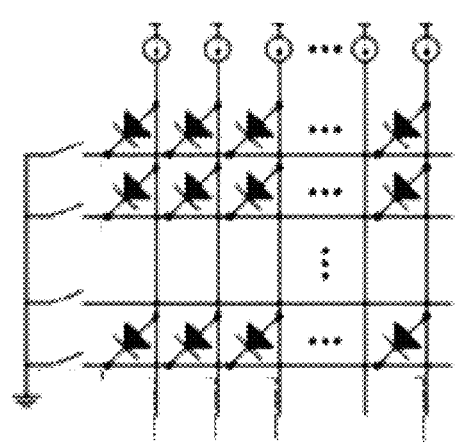
FIG. 14 is a schematic diagram showing a driving mode of passive addressing of micro-sized light emitting diodes in accordance with an embodiment of the present disclosure.

FIG. 14 shows a driving mode of passive addressing of the micro-sized light emitting diodes, the anodes of the light emitting units in each column of the micro-sized LED array are connected to the column scanlines while the cathodes of the light emitting units in each row of the micro-sized LED array are connected to the row scanlines. When a particular $Y^{th}$ column scanline and $X^{th}$ row scanline are gated, the LED pixels at the intersection (X, Y) are illuminated. In this way, the whole micro-sized light emitting diodes array is scanned in the high-speed point-by-point manner to realize the desired structured light fringes.

In addition, the micro-sized LEDs can also be driven by the active addressing mode. Each of the light emitting units corresponds to one independent driving circuit, and the driving current is supplied from a driving transistor. Compared to the passive addressing mode in FIG. 14, the structure using the active addressing control mode is more complicated, but it can simplify the connection between each illumination unit and improve the crosstalk-prone deficiency of the strobe signal.

In conclusion, the present disclosure includes the structured illumination source. The beam shaping lens, the excitation optical filter and the dichroic mirror are provided on the emission light path of the structured illumination source in sequence. The objective lens and the sample are provided on the first optical path of the dichroic mirror in sequence. The emission optical filter, the tube lens, and the detector are provided on the second optical path of the dichroic mirror in sequence. Compared to a structured illumination microscopic imaging system provided with a fly-eye lens, the present disclosure can obtain super-resolution microscopic images with a higher signal-to-noise ratio and higher contrast under the premise of lowering the installation and processing precision requirements of the structured illumination microscopic imaging system. Compared to a structured illumination microscopic imaging system based on digital micromirror arrays or gratings, the present disclosure significantly reduces the system cost and provides a greater system stability. Moreover, the present disclosure uses the illumination source of micro-sized light-emitting diode as the structural illumination source to simply the structure of the structural light microscopic imaging system, which facilitates installation and modulation, is low cost, and obtains the structured illumination micro-optic system with a high resolution, high stability and high contrast.

Obviously, those skilled in the art can make various modifications and changes to the present application without departing from the spirit and scope of the present disclosure. Thus, if these modifications and changes to the present disclosure fall within the scope of the claims of the present disclosure and the equivalent technology thereof, these modifications and changes are contained in the present disclosure.

It is clear to those skilled in the art that the present disclosure is not limited to the details of the above-described exemplary embodiments, and the present disclosure can be embodied in other specific forms without departing from the spirit or essential characteristics of the present disclosure. Therefore, in any cases, the embodiments should be considered exemplary and non-restrictive. The scope of the present disclosure is limited by the claims rather than the above description, so all changes falling within the meaning and scope of the equivalent elements of the claims in the present disclosure is contained in the present disclosure. Any reference numerals in the claims form no limit to the claims. In addition, the term "including" does not exclude other units or steps, and the singular does not exclude plural. The plurality of units or devices stated in the device claims can also be implemented by one unit or device through software or hardware. The terms "first", "second" and the like are used to mean a name and do not indicate any particular order.

What is claimed is:

1. A structured illumination microscopic imaging system, comprising:
   a structured illumination source;
   a beam shaping lens, an excitation optical filter and a dichroic mirror, sequentially provided on an emission light path of the structured illumination source; wherein, the beam shaping lens comprises more than one lens;
   an objective lens and a sample, sequentially provided on a first optical path of the dichroic mirror; and
   an emission optical filter, a tube lens, and a detector, sequentially provided on a second optical path of the dichroic mirror;
   wherein the structured illumination source comprises a micro-sized illuminating light source configured to produce structured light having bright and dark fringes;
   wherein the micro-sized illuminating light source comprises a substrate and an array of light emitting units arranged on the substrate; wherein a size of each light emitting unit has a square area in a range of 1 μm×1 μm to 100 μm×100 μm;
   wherein each of the light emitting units in the array of light emitting units is independently controllable for obtaining structural light fringes;
   wherein a duty ratio is a ratio of the bright and dark fringes, and the duty ratio is one of 1:1, 1:2, or 1:3; and
   wherein a spacing between two adjacent light emitting units is determined by a shape of the light emitting unit, a number of lenses included in the beam shaping lens, a focal length of the beam shaping lens, a magnification of the objective lens, and a focal length of the objective lens, causing a spacing between adjacent images on a surface of the sample is less than half of a wavelength of light emitted from the light emitting units.

2. The structured illumination microscopic imaging system according to claim 1, wherein, the objective lens and the sample are sequentially provided on the first optical path of the dichroic mirror; wherein the first optical path is a light-reflection path of the dichroic mirror; the emission optical filter, the tube lens and the detector are sequentially provided on the second optical path of the dichroic mirror; wherein the second optical path is a light-transmission path of the dichroic mirror.

3. The structured illumination microscopic imaging system according to claim 1, wherein, the objective lens and the sample are sequentially provided on the first optical path of the dichroic mirror; wherein the first optical path is a light-transmission path of the dichroic mirror; the emission optical filter, the tube lens and the detector are sequentially provided on the second optical path of the dichroic mirror; wherein the second optical path is a light-reflection path of the dichroic mirror.

4. The structured illumination microscopic imaging system according to claim 1, wherein, the beam shaping lens is provided on the emission light path of the structured illumination source;
the excitation optical filter is provided on the emission light path of the beam shaping lens;
the dichroic mirror is configured to reflect structured light on the emission light path of the excitation optical filter to the objective lens.

5. The structured illumination microscopic imaging system according to claim 4, wherein, the objective lens is configured to receive the structured light reflected by the dichroic mirror and project the structured light onto the sample;
the sample is configured to receive the structured light projected by the objective lens to form structured light and to excite fluorescence, the fluorescence is sequentially transmitted through the objective lens and the dichroic mirror.

6. The structured illumination microscopic imaging system according to claim 5, wherein, the emission optical filter is configured to filter the fluorescence transmitted through the dichroic mirror;
the tube lens is provided on the second optical path of the dichroic mirror, and is configured to collect and transmit the fluorescence filtered by the emission optical filter;
the detector is configured to receive the fluorescence transmitted by the tube lens.

7. The structured illumination microscopic imaging system according to claim 1, wherein, the structured illumination source is conjugated with a surface of the sample, and the surface of the sample is conjugated with an imaging surface of the detector.

8. The structured illumination microscopic imaging system according to claim 1, wherein, each of the light emitting units is a micro-sized light-emitting diode and is independently controlled to form an image by quick switching and phase shifting of the structural light fringes.

9. The structured illumination microscopic imaging system according to claim 1, wherein each light emitting unit is a square with a size of 20 µm×20 µm, and a spacing between adjacent light emitting units is 4 µm.

10. A structured illumination microscopic imaging system, comprising:
a structured illumination source;
a beam shaping lens, an excitation optical filter and a dichroic mirror, sequentially provided on an emission light path of the structured illumination source; wherein, the beam shaping lens comprises more than one lens;
an objective lens and a sample, sequentially provided on a first optical path of the dichroic mirror; and
an emission optical filter, a tube lens, and a detector, sequentially provided on a second optical path of the dichroic mirror;
wherein the structured illumination source comprises a micro-sized illuminating light source configured to produce structured light having bright and dark fringes;
wherein the micro-sized illuminating light source comprises a substrate and an array of light emitting units arranged on the substrate;
wherein each of the light emitting units in the array of light emitting units is independently controllable for obtaining structural light fringes;
wherein, a shape of at least one of the light emitting units is circular;
wherein a duty ratio is a ratio of the bright and dark fringes, and the duty ratio is one of 1:1, 1:2, or 1:3; and
wherein a spacing between two adjacent light emitting units is determined by a shape of the light emitting unit, a number of lenses included in the beam shaping lens, a focal length of the beam shaping lens, a magnification of the objective lens, and a focal length of the objective lens, causing a spacing between adjacent images on a surface of the sample is less than half of a wavelength of light emitted from the light emitting units.

11. The structured illumination microscopic imaging system according to claim 10, wherein, a diameter of the at least one of the light emitting units is in a range of 1 µm to 100 µm.

* * * * *